UNITED STATES PATENT OFFICE.

FREDERICK BURTON, OF LONDON, ENGLAND, ASSIGNOR TO THE ALUMINIUM COMPANY, LIMITED, OF SAME PLACE.

PROCESS OF PURIFYING OILS OR FATS.

SPECIFICATION forming part of Letters Patent No. 543,079, dated July 23, 1895.

Application filed November 17, 1894. Serial No. 529,154. (No specimens.)

*To all whom it may concern:*

Be it known that I, FREDERICK BURTON, a subject of Her Majesty the Queen of Great Britain, residing at Bethnal Green, London, England, have invented a certain new and useful Process for the Purification of Oils, Fats, and the Like; and I do hereby declare that the following is a full, clear, and exact description of the invention, which will enable others skilled in the art to which it appertains to make and use the same.

My invention relates to the purification of oils, fats, and the like, by treating them with sodium peroxide. In order to prevent too violent action and saponification, I prefer, before adding the sodium peroxide, to acidulate the material by addition of sulphuric or other suitable acid; also, in order to retard the evolution of oxygen from the sodium peroxide, I prefer, before adding it, to add a small quantity of a salt of an alkali or alkaline earth, which may be added along with the acid. After the reaction with the sodium peroxide is completed, the impurities can be separated by skimming off those that float, decanting from those that are precipitated, or by filtering.

For refining linseed-oil I adopt, by way of example, the following process: The raw oil is run into a suitable receptacle and sulphuric acid 1.55° specific gravity, 110° Twaddle, is added to precipitate mucilage. The percentage of sulphuric acid used to precipitate mucilage varies according to the quality of the oil used, the operative limits being usually from one twenty-fifth of one per cent. to one per cent. After twelve to fourteen hours or more the cleared oil is drawn off from the precipitated sludge into another receptacle and a quantity of sulphuric acid of, preferably, 1.7° specific gravity, 140° Twaddle, (in which has previously been dissolved sodium phosphate or other suitable salt of an alkaline earth to the extent of five per cent. on the weight of sodium peroxide to be used,) is added sufficient to exactly neutralize the requisite quantity of sodium peroxide, which varies from one-fourth to one per cent. (according to the nature) of oil treated. The mixture is then well agitated and the sodium peroxide is added slowly, care being taken not to add too much at a time. The agitation is continued after all the sodium peroxide has been added for two to three hours, when the whole is allowed to stand for twenty-four hours, in which time the sulphuric acid should have neutralized the sodium peroxide. The oil must then be washed after decanting or filtering.

As an illustration I may quote the following figures, with which I have obtained good results: For one hundred and eight gallons or one thousand pounds of oil I take eighty fluid ounces of sulphuric acid of 1.7° specific gravity, and in such acid I dissolve four ounces of sodium phosphate. The acid containing the phosphate is then added to the oil, which should be constantly stirred during such addition and for one-half to two hours subsequently thereto. The bath is then neutralized by the slow addition of five pounds of sodium peroxide.

From the foregoing figures it will be noted that the five pounds of sodium peroxide is equal to one-half per cent. of the weight of the oil. The four ounces of sodium phosphate is equal to five per cent. of the weight of sodium peroxide and the eighty fluid ounces of sulphuric acid of 1.7° specific gravity is the approximate quantity necessary to neutralize the five pounds sodium peroxide.

The use of sodium phosphate or other salt is beneficial because it assists the precipitation and, so far as this operation is concerned, it destroys or neutralizes the injurious activity of any slight impurity (such as iron) which may be contained in the sodium peroxide. If any such impurity be present and unprovided for it encourages a too rapid and wasteful evolution of oxygen, to the detriment of economical working.

The oil, when heated to 57° Fahrenheit, retains its pale color.

The refined oil dries more rapidly than before treatment. By the use of a larger quantity of sodium peroxide and operating at a higher temperature the drying properties approach those of boiled oil.

For refining cotton-seed oil, the crude oil having been once or twice purged with caustic soda in the usual manner, may be treated with from one-fourth to one per cent. of sodium peroxide in the following manner: Having estimated the quantity of sulphuric acid, preferably 1.350° specific gravity, necessary to neutralize the sodium peroxide to be used I dissolve in the sulphuric acid a quantity of salts of an alkaline earth, preferably phosphate of soda, which is usually five per cent. of the weight of sodium peroxide. This acid solution is added to the oil and thoroughly incorporated by agitation. I then neutralize by the gradual addition of sodium peroxide with continual stirring for one hour. I then add methylated spirit, 64° over proof, in volume from one-half to one per cent. of the volume of oil. The addition of methylated spirit or alcohol will minimize any risk of burning the oil, owing to the careless addition of the dry sodium peroxide in too large quantities. With occasional stirring this process should be completed in twenty-four hours. The oil must then be washed, after decanting or filtering. I also find that some cotton-seed oil may be treated without acid. In such cases I first add to the oil the phosphate of soda in saturated solution, then add the sodium peroxide slowly.

In treating the linseed, cotton-seed, or other oils or fats, I sometimes dissolve the sodium peroxide or part thereof in a mixture of alcohol or methylated spirit and water before adding it to the oil.

What I claim is—

1. The herein described process for purifying oils or fats by treating same with an acid and a salt of an alkaline earth, and then adding thereto sodium peroxide as described.

2. The herein described process for purifying oils or fats by treating same with an acid and a salt of an alkaline earth, then adding thereto sodium peroxide and subsequently alcohol or like spirit, substantially as described.

In testimony whereof I have hereunto set my hand in the presence of two subscribing witnesses.

FREDERICK BURTON.

Witnesses:
T. F. BARNES,
THOMAS LAKE.